(12) United States Patent
Ding et al.

(10) Patent No.: US 10,101,847 B2
(45) Date of Patent: Oct. 16, 2018

(54) TOUCH SCREEN AND DRIVE METHOD THEREFOR, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Lei Wang, Beijing (CN); Hongjuan Liu, Beijing (CN); Xue Dong, Beijing (CN); Haisheng Wang, Beijing (CN); Weijie Zhao, Beijing (CN); Yingming Liu, Beijing (CN); Shengji Yang, Beijing (CN); Chunlei Wang, Beijing (CN); Tao Ren, Beijing (CN)

(73) Assignees: BOE TECHNOLOGY GROUP CO., LTD., Beijing (CN); BEIJING BOE OPTPELECTRONICS TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 15/025,672

(22) PCT Filed: Jul. 30, 2014

(86) PCT No.: PCT/CN2014/083356
§ 371 (c)(1),
(2) Date: Mar. 29, 2016

(87) PCT Pub. No.: WO2015/154349
PCT Pub. Date: Oct. 15, 2015

(65) Prior Publication Data
US 2016/0274721 A1 Sep. 22, 2016

(30) Foreign Application Priority Data
Apr. 9, 2014 (CN) .......................... 2014 1 0141667

(51) Int. Cl.
*G06F 3/044* (2006.01)
*G06F 3/041* (2006.01)
(Continued)

(52) U.S. Cl.
CPC ........ *G06F 3/0416* (2013.01); *G02F 1/13338* (2013.01); *G02F 1/133512* (2013.01);
(Continued)

(58) Field of Classification Search
CPC ...... G06F 3/044; G06F 3/0412; G06F 3/0416; G06F 2203/04103
See application file for complete search history.

(56) References Cited

U.S. PATENT DOCUMENTS

2011/0074729 A1* 3/2011 Im ......................... G06F 3/0412
345/174
2012/0307189 A1* 12/2012 Baek ....................... G02F 1/137
349/139
(Continued)

FOREIGN PATENT DOCUMENTS

CN 102914920 A 2/2013
CN 102937845 A 2/2013
(Continued)

OTHER PUBLICATIONS

Search Report and Written Opinion dated Dec. 30, 2014 from State Intellectual Property Office of the P.R. China.
(Continued)

*Primary Examiner* — Olga Merkoulova
(74) *Attorney, Agent, or Firm* — Dilworth & Barrese, LLP; Michael J. Musella

(57) ABSTRACT

A touch screen and a drive method therefor, and a display device. The touch screen includes a color filter substrate and an array substrate that are disposed opposite to each other. The color filter substrate includes a first base substrate and
(Continued)

a first electrode disposed on the first base substrate; the array substrate includes a second base substrate and a transparent conductive layer that is disposed on the second base substrate, and the transparent conductive layer includes a second electrode and a common electrode, with the first electrode being staggered with the second electrode; in a touch time period, a signal on the common electrode is the same as the signal on the first electrode; in a display time period, the second electrode and the common electrode are configured for loading a common electrode signal.

19 Claims, 4 Drawing Sheets

(51) Int. Cl.
  *G02F 1/1333* (2006.01)
  *G02F 1/1335* (2006.01)
  *G02F 1/1343* (2006.01)
(52) U.S. Cl.
  CPC .. *G02F 1/133514* (2013.01); *G02F 1/134363* (2013.01); *G06F 3/044* (2013.01); *G06F 3/0412* (2013.01); *G06F 2203/04103* (2013.01)

(56) References Cited

U.S. PATENT DOCUMENTS

| | | | |
|---|---|---|---|
| 2013/0293498 A1 | 11/2013 | Kim et al. | |
| 2014/0071360 A1* | 3/2014 | Chang | G06F 3/0412 349/12 |
| 2016/0246425 A1* | 8/2016 | Liu | G06F 3/044 |

FOREIGN PATENT DOCUMENTS

| | | |
|---|---|---|
| CN | 103049155 A | 4/2013 |
| CN | 103049157 A | 4/2013 |
| CN | 103207719 A | 7/2013 |
| CN | 103293737 A | 9/2013 |
| CN | 103399665 A | 11/2013 |
| CN | 103698927 A | 4/2014 |
| CN | 103941916 A | 7/2014 |
| CN | 203759678 U | 8/2014 |

OTHER PUBLICATIONS

Chinese Office Acton dated Apr. 25, 2016.
Extended European Search Report dated Oct. 16, 2017.

* cited by examiner

TOUCH SCREEN AND DRIVE METHOD THEREFOR, AND DISPLAY DEVICE

TECHNICAL FIELD

At least one embodiment of the present disclosure pertains to a touch screen, a driving method of the touch screen and a display device.

BACKGROUND

Along with development of display technology, touch screen technology also develops rapidly. Touch screens, according to structure, can be divided into two types including add-on touch screens and in-cell touch screens. An in-cell touch screen, with a touch sensing electrode being embedded inside a liquid crystal display panel, can reduce a thickness of a device as a whole and reduce manufacture cost.

As illustrated in FIG. 1, an in-cell touch screen includes a color filter substrate 10 and an array substrate 20 that are disposed opposite to each other. The color filter substrate 10 includes a first base substrate 1, a plurality of color pixel areas 2 provided on the first base substrate 1, and light-block areas 3 that are located between the color pixel areas 2. Touch sensing electrodes 4 are provided at positions of the light-block areas 3. An array substrate 20 includes a second base substrate 7 and a transparent conductive layer disposed on the second base substrate 7. The transparent conductive layer includes touch driving electrodes 6 and common electrodes 5, and the common electrodes correspond to the position of the touch sensing electrodes 4 on the color filter substrate 10. Upon touch driving signals (Tx) being applied on the touch driving electrodes 6, the touch sensing electrodes 4 receive touch sensing signals (Rx), and then by calculation of variation of capacitance formed by the touch sensing electrodes 4 and the touch driving electrodes 6 before and after the touch operation by a finger, it is determined whether a touch occurs or not, so as to realize a touch function. In addition, a common electrode signal (Vcom) is applied on the common electrodes 5 to realize display.

SUMMARY

At least one embodiment of the present disclosure provides a touch screen and a driving method of the touch screen and a display device. The touch screen can avoid being influenced by parasite capacitance of a common electrode and a touch sensing electrode and avoid a case that mutual capacitance of a touch sensing electrode and a touch driving electrode is small, and hence avoid poor touch effect.

At least one embodiment of the present disclosure provides a touch screen comprising: a color filter substrate and an array substrate that are provided opposite to each other. The color filter substrate comprises a first base substrate and a first electrode disposed on the first base substrate. The array substrate comprises a second base substrate and a transparent conductive layer that is disposed on the second base substrate and the transparent conductive layer comprises a second electrode and a common electrode. The first electrode and the second electrode are staggered with each other. The first electrode is a touch sensing electrode and the second electrode is a touch driving electrode, or the second electrode is a touch sensing electrode and the first electrode is a touch driving electrode. In a touch time period, the first electrode is configured for receiving a touch sensing signal and the second electrode is configured for applying a touch driving signal and a signal on the common electrode is the same as that on the first electrode; in a display time period, the second electrode and the common electrode are configured for loading a common electrode signal.

At least one embodiment in the present disclosure provides a display device, comprising the above touch screen.

At least one embodiment in the present disclosure provides a driving method of a touch screen, comprising: in a touch time period, a first electrode and a second electrode respectively receives a touch sensing signal and applies a touch driving signal, with a signal on the common electrode being the same as the signal on the first electrode; in a display time period, the second electrode and the common electrode applies a common electrode signal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and, it is not limitative to the scope of the present disclosure.

Reference Marks:
1—first base substrate; 2—color pixel area; 3—light-block area; 4—sensing electrode; 5—common electrode; 6—driving electrode; 7—second base substrate; 10—color filter substrate; 20—array substrate.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
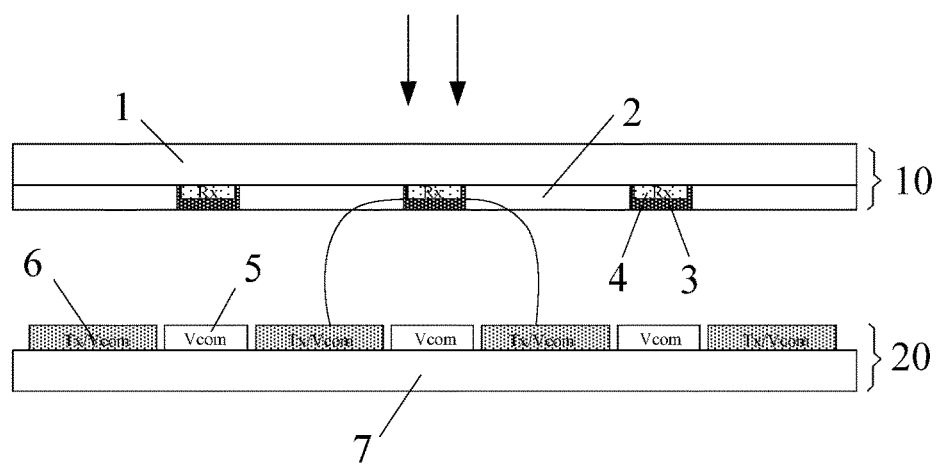
FIG. 1 is a schematic view of a touch screen.

In a touch screen illustrated in FIG. 1, because parasite capacitance, produced between a common electrode 5 and a touch sensing electrode 4, can make the value of mutual capacitance between a touch sensing electrode 4 and a touch driving electrode become small, which is unfavorable for signal reception, touch effect remains to be improved.

At least one embodiment of the present disclosure provides a touch screen comprising: a color filter substrate and an array substrate that are provided opposite to each other.

The color filter substrate comprises a first base substrate and a first electrode disposed on the first base substrate. The array substrate comprises a second base substrate and a transparent conductive layer that is disposed on the second base substrate, and the transparent conductive layer comprises a second electrode and a common electrode. The first electrode and the second electrode are staggered with each other. The first electrode is a touch sensing electrode and the second electrode is a touch driving electrode, or the second electrode is a touch sensing electrode and the first electrode is a touch driving electrode. In a touch time period, the first electrode is configured for receiving a touch sensing signal and the second electrode is configured for applying a touch driving signal, and the signal over the common electrode is the same as that over the first electrode; in a display time period, the second electrode and the common electrode are configured for loading a common electrode signal.

For example, the first electrode and the second electrode are staggered with each other, that is, the first electrode and the second electrode are offset from each other, without being directly facing each vertically.

Figure 7:
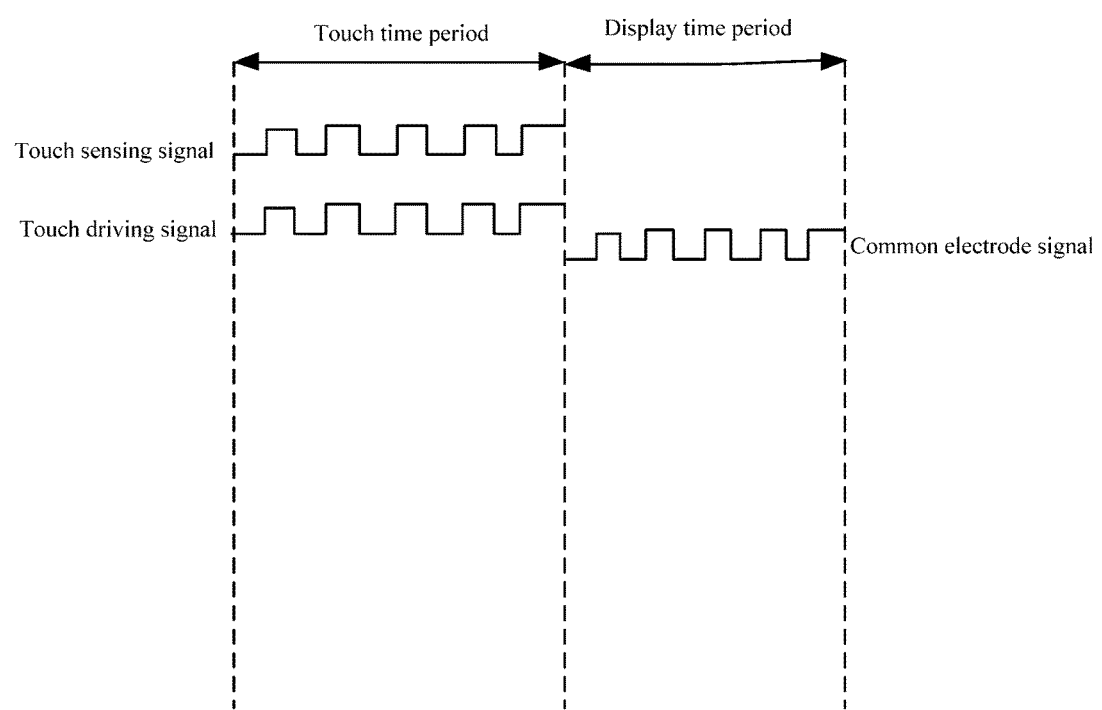
FIG. 7 is a controlling sequence chart of a touch screen provided in an embodiment of the present disclosure.

For example, in at least one embodiment of the present disclosure, a time-shared display and touch operation is employed. FIG. 7 is a controlling sequence chart of a touch screen provided in an embodiment of the present disclosure. As shown in FIG. 7, in driving, time of a frame is divided into a display time period and a touch time period; in the touch time period, a touch sensing electrode and a common electrode respectively receives a touch sensing signal, a touch driving electrode is applied with a touch driving signal and performs coupling of the touch drive signal in the touch time period to produce a touch sensing signal, and the touch sensing signal is output via the touch sensing electrode and the common electrode. In a display time period, the common electrode and the touch driving electrode are both applied with common electrode signal, under such a case, the common electrode and the touch sensing electrode collectively function as a common electrode to realize display.

A common electrode layer can be made from a transparent conductive material, such as ITO (indium tin oxide) or IZO (indium zinc oxide).

In at least one embodiment of the present disclosure, the first electrode is a touch sensing electrode and the second electrode is a touch driving electrode, or the second electrode is a touch sensing electrode and the first electrode is a touch driving electrode, which can include following cases: the first electrode is a touch sensing electrode and the second electrode is a touch driving electrode; or the first electrode is a touch driving electrode and the second electrode is a touch sensing electrode. A touch sensing electrode is employed to receive a touch sensing signal in a touch time period and a touch driving electrode is employed to apply a touch driving signal in a touch time period.

In at least one embodiment of the present disclosure, for example, a case that the first electrode is a touch sensing electrode and the second electrode is a touch driving electrode is taken as an example to explain in detail.

In an embodiment, in a touch time period, the first electrode is configured for receiving a touch sensing signal and the second electrode is configured for applying a touch driving signal, and the common electrode and the first electrode are applied with a same signal. In a display time period, the second electrode and the common electrode are for applying a common electrode signal. That is, in a touch time period, the first electrode is employed to receive a touch sensing signal and the second electrode is employed to apply a touch driving signal, under such a case, the signal of the common electrode is the same as that of the first electrode, both receiving touch sensing signal. In a display time period, the second electrode and the common electrode are employed to apply a common electrode signal.

In another embodiment, in a touch time period, the first electrode is employed to apply a touch driving signal and the second electrode is employed to receive a touch sensing signal, under such a case, the signal of the common electrode is the same as that of the first electrode, both being employed to apply a touch driving signal. In a display time period, a display function is realized by applying a common electrode signal on a common electrode and a touch driving electrode.

In at least one embodiment of the present disclosure, in a touch time period, the first electrode is for receiving a touch sensing signal and the second electrode is for applying a touch driving signal. Hereinafter, a case that the signal of the common electrode is the same as that of the first electrode with both being employed to receive a touch sensing signal is taken as an example for detailed description.

Figure 2:
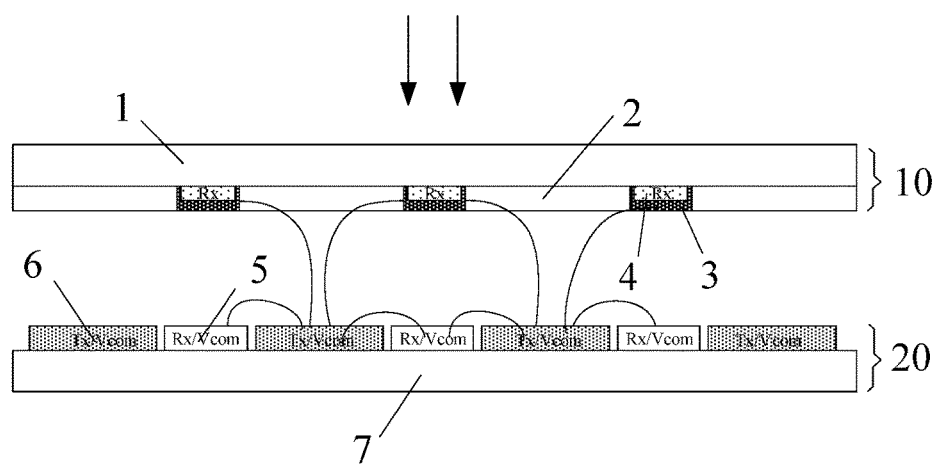
FIG. 2 is a schematic views for illustrating touch effect of a touch screen provided in an embodiment of the present disclosure.

As illustrated in FIG. 2, in a touch time period, a touch sensing electrode 4 on a color filter substrate 10 at a touch position receives a touch sensing signal (Rx) and a touch driving electrode 6 on an array substrate 20 applies a touch driving signal (Tx), with a common electrode 5 receiving the touch sensing signal (Rx). Therefore, in the touch time period, a touch field is formed between the touch sensing electrode 4 on the color filter substrate 10 and the common electrode 5 on the array substrate 20, and a touch field is formed between the touch sensing electrode 4 on the color filter substrate 10 and the touch driving electrode 6 on the array substrate 20 as well, which can increase mutual capacitance between the touch driving electrode TX and the touch sensing electrode RX. Upon a touch being performed by a finger, electric field lines absorbed by the finger increase, that is, variation of mutual capacitance by the finger is increased, which is in favor of strengthening touch magnitude. In addition, because the touch sensing electrode is applied with same signal as that of the common electrode, so electric potential difference is not generated between the touch sensing electrode and the common electrode, which is in favor of reducing parasite capacitance and noise interference.

In a display time period, a common electrode 5 and a touch driving electrode 6 on an array substrate are applied with a common electrode signal (Vcom) at the same time, so as to realize display.

At least one embodiment of the present disclosure provides a touch screen, wherein the first electrode is a touch sensing electrode and the second electrode is a touch driving electrode, or the second electrode is a touch sensing electrode and the first electrode is a touch driving electrode. The touch sensing electrode is configured for receiving touch sensing electrode in a touch time period and a touch driving signal is applied by the touch driving electrode in the touch time period. In the touch time period, the first electrode and the second electrode respectively receives a touch sensing signal and applies a touch driving signal, and the signal of the common electrode is the same as that of the first electrode. In the display time period, the second electrode and the common electrode are employed to apply a common electrode signal. Therefore, in the touch time period, the first electrode forms a touch field respectively with the common electrode and the second electrode, which is in favor of strengthening touch magnitude. In addition, because the signal of the touch sensing electrode is the same as that of the common electrode, so electric potential difference is not generated between the touch sensing electrode and the common electrode, which is in favor of reducing parasite capacitance and noise interference.

In at least one embodiment of the present disclosure, the color filter substrate includes a color film layer and a black matrix film layer; the first electrode corresponds to the black matrix. The array substrate includes a pixel electrode layer, with the second electrode being corresponding to the pixel electrode.

In at least one embodiment of the present disclosure, a color filter substrate includes a first base substrate and includes a black matrix film layer and a color film layer that are provided on the first base substrate. The first electrode corresponds to the black matrix film layer, that is, the touch sensing electrode is disposed at the position of a corresponding black matrix. Of course, the touch sensing electrode can be a transparent electrode, under such a case, the touch sensing electrode can also be provided at a position, corresponding to a color film layer, on the color filter substrate.

In at least one embodiment of the present disclosure, the array substrate includes a pixel electrode layer and a transparent conductive layer, with the pixel electrode layer including a pixel electrode, and the transparent conductive layer including a common electrode and a second electrode; in addition, the second electrode is provided at a position corresponding to the pixel electrode. In a display time period, because a second electrode is applied with a common electrode signal, that is, a horizontal electric field is formed by a pixel electrode and a second electrode to drive liquid crystal for display.

In at least one embodiment of the present disclosure, a common electrode on the array substrate is connected to a first electrode on the color filter substrate. Because of a first electrode being electrically connected to a common electrode, a touch sensing signal will be received by them at a same time. For example, a common electrode on the array substrate is electrically connected, via anisotropy conductive adhesive (e.g., including conductive particle (for example, metal balls)), with a first electrode on the color filter substrate, so as to realize synchronized reception of touch sensing signal.

By electrically connecting a common electrode and a first electrode, the signal of a common electrode is the same as that of a first electrode, allowing electric potential of both to be equal to each other, thus reducing parasite capacitance between the first electrode and the common electrode, which can improve touch effect.

Figure 3:
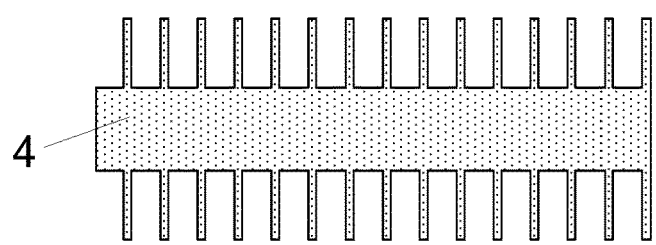
FIG. 3 is a schematic view of a first electrode provided in an embodiment of the present disclosure.
Figure 4:
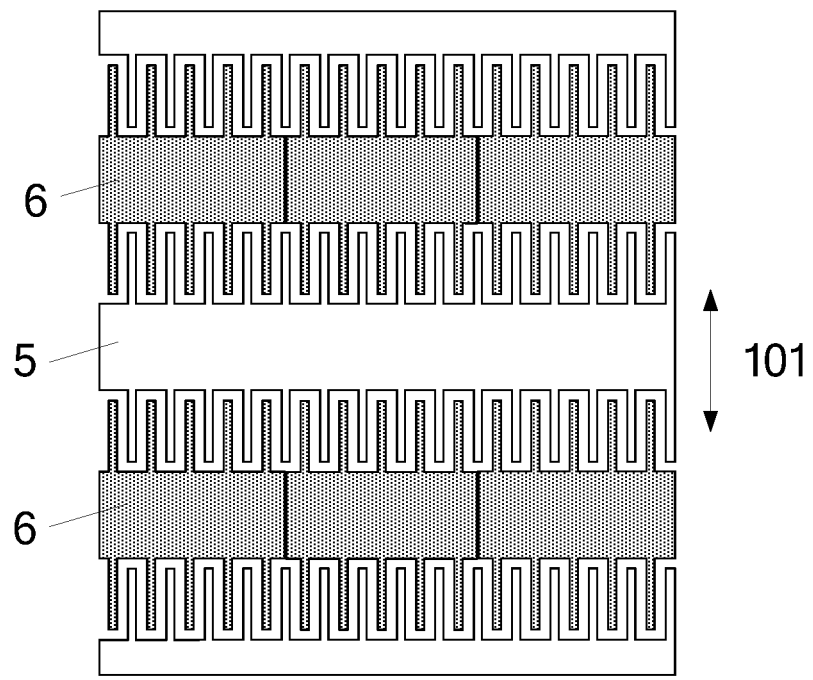
FIG. 4 is a schematic view of second electrodes and common electrodes provided in an embodiment of the present disclosure.

In at least one embodiment of the present disclosure, the common electrode is provided at a position corresponding to that of the first electrode. That is, the touch sensing electrode is provided at a position correspond to that of the common electrode, under such a case, because the touch sensing electrode and the common electrode receive the same sensing signal and constitute a new touch sensing electrode, which reduces the directly facing area of the common electrode and the touch sensing electrode, hence reducing parasite capacitance of the touch sensing electrode. For example, the width, in a direction that a first electrode is arranged, of the common electrode is greater than the width of the first electrode. Because the first electrode is disposed on the color filter substrate and the common electrode is disposed on the array substrate, the width of the common electrode in the direction that the first electrode is arranged is greater than the width of the first electrode. For example, as illustrated in FIG. 3 and FIG. 4, the width of the common electrode 5 in a direction 101 is greater than a width of the sensing electrode 4 as illustrated in FIG. 3. Therefore, it is possible to further increase mutual capacitance between a touch sensing electrode and a touch driving electrode, so as to benefit signal reception and strength touch effect.

In at least one embodiment of the present disclosure, the common electrode and a first electrode are of a same structure, and they both form a finger interleaving electrode structure with the second electrode.

For example, a sensing electrode 4 on a color filter substrate can be a multi-finger structure as illustrated in FIG. 3 while a common electrode 5 and a driving electrode 6 on an array substrate 20 can be a finger interleaving structure as illustrated in FIG. 4. A sensing electrode 4 on a color filter substrate 1 is provided at a position corresponding to the position of a common electrode 5 on an array substrate, and so the sensing electrode 4 is of a same shape as that of the common electrode 5. In at least one embodiment of the present disclosure, for example, a width of a common electrode in a direction that a first electrode is arranged (namely, in a direction indicated by 101 in FIG. 4) is greater than that the width of the sensing electrode 4. Under such a case, mutual capacitance of a sensing electrode 4 and a driving electrode 5 is increased, which improves touch sensitivity and accuracy.

Figure 5:
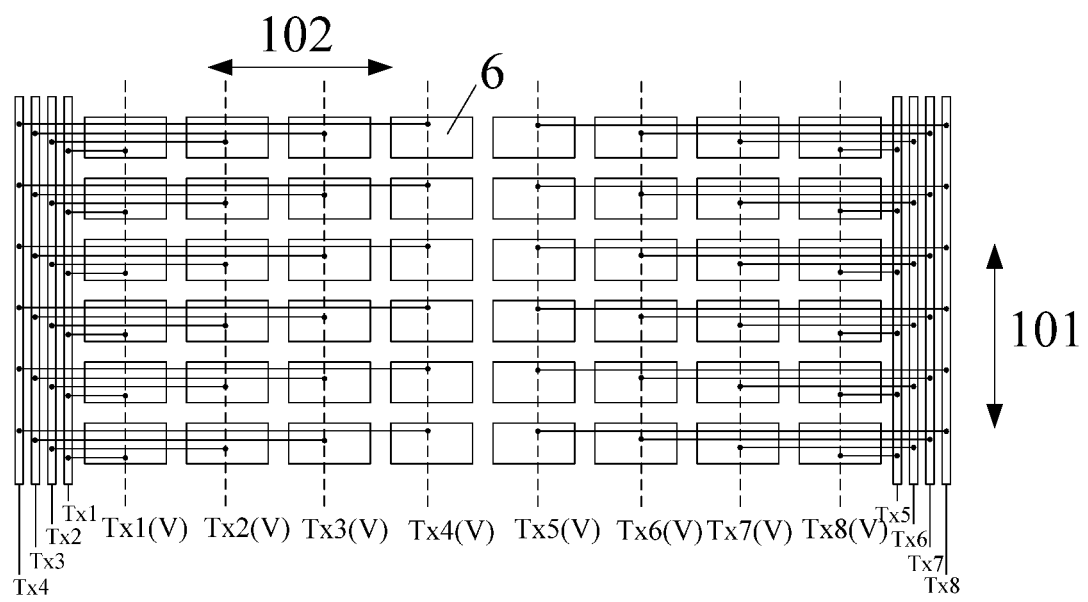
FIG. 5 is a schematic view for electrical connection of second electrodes illustrated in FIG. 4.
Figure 6:
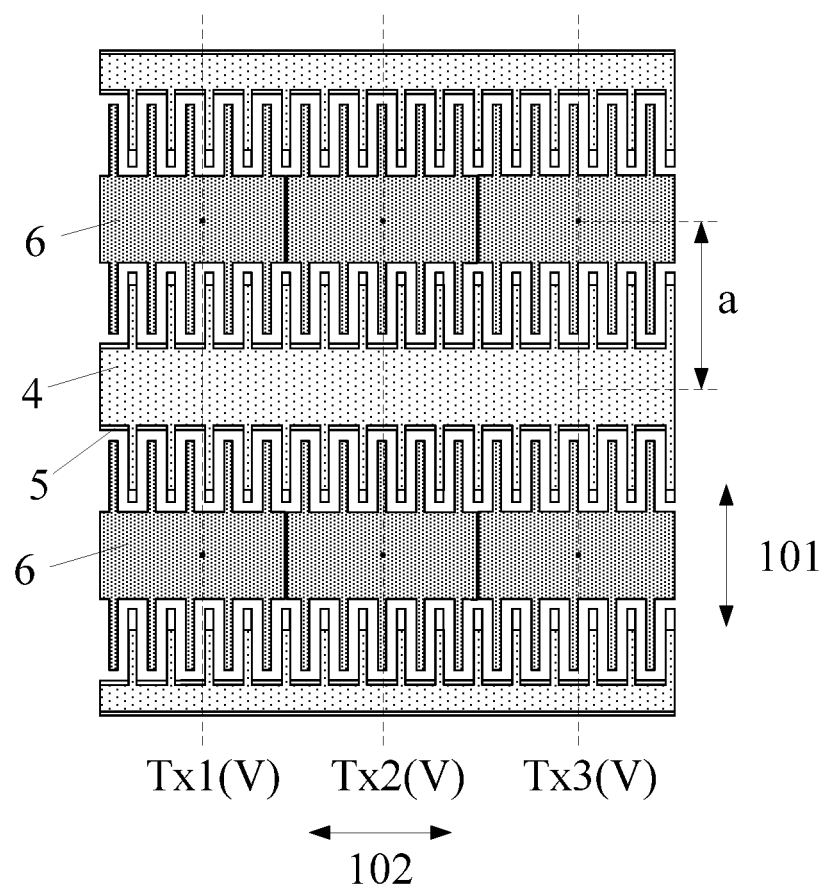
FIG. 6 is a schematic vertical view of a touch screen provided in another embodiment of the present disclosure.

In addition, to achieve touch function, a sensing electrode 4 can be vertically disposed opposite to a common electrode 5. Specifically, a sensing electrode 4 can be as illustrated in FIG. 3, and a driving electrode 6 and a common electrode 5 can be as illustrated in FIG. 4; a specific connection mode of a driving electrode 6 can be as illustrated in FIG. 5. Driving electrodes 6, namely, Tx(V) are electrically connected via corresponding lead wires Tx respectively, so as to form a plurality of driving electrodes that are perpendicular to sensing electrodes in a direction (namely, a direction indicated by 102) that sensing electrodes are arranged, namely, the direction perpendicular to the direction indicated by 101. For example, in FIG. 5, a case that driving electrodes 6 include Tx1(V)-Tx8(V) and lead wires include Tx1-Tx8 is taken as an example for detail explanation. For example, a schematic bottom view of a touch screen, which comprises the sensing electrode 4 as illustrated in FIG. 3 and the common electrode 5 and the driving electrode 6 as illustrated in FIG. 4, is illustrated in FIG. 6. As illustrated in FIG. 5, a drive electrode Tx1(V) is electrically connected via Tx1, a driving electrode Tx2(V) is electrically connected via Tx2, and a driving electrode Tx3(V) is electrically connected via Tx3. That is, driving electrodes 6 are arranged in rows in a direction indicated by 102, and are perpendicular to sensing electrodes 4 that are formed in rows in a direction indicated by 101, so as to realize touch function with the sensing electrodes 4 and the driving electrodes 6. For example, as illustrated in FIG. 6, a center-to-center distance between a driving electrode 6 and a sensing electrode 6 is 5-6 mm.

Of course, it is also viable to allow a touch sensing electrode vertically correspond to a touch driving electrode, and under such a case, a common electrode can be provided at a position corresponding to the position of a black matrix of a color film layer.

At least one embodiment of the present disclosure provides a driving method of a touch screen, including: in a touch time period, a first electrode and a second electrode respectively receives a sensing signal and applies a touch driving signal, and a signal of the common electrode is the same as that of the first electrode; in a display time period, the second electrode and the common electrode apply common electrode signal.

In the touch time period, the first electrode and the second electrode respectively receives touch the sensing signal and applies the touch driving signal, and the signal of the common electrode is the same as the signal of the first electrode; in the display time period, the second electrode and the common electrode apply the common electrode signal. For example, in a touch time period, the first electrode receives a touch sensing signal and the second electrode applies a touch driving signal, and at the same time the signal of the common electrode is the same as that of the first electrode, that is, the common electrode receives the touch sensing signal; in a display time period, the second electrode and the common electrode applies a common electrode signal. Or, in a touch time period, the first electrode applies a touch driving electrode and the second electrode receives a touch sensing electrode, and at the same time, the signal of the common electrode is the same as the signal of the first electrode, that is, the common electrode applies a touch driving signal; in a display time period, a common electrode signal is applied on the common electrode and the driving electrode to realize display function.

A touch screen, provided in at least one embodiment of the present disclosure, by allowing a common electrode and a first electrode to receive a touch sensing signal at a same time or apply a touch driving signal at a same time in a touch time period, can reduce parasite capacitance between the common electrode and the first electrode. In addition, because the signal of the common electrode is the same as the signal of the first electrode, a touch field is formed between the common electrode and the second electrode, so that touch sensitivity is strengthen and meanwhile noise interference is reduced.

A driving method is provided in an embodiment of the present disclosure, applied to any touch screen provided in an embodiment of the present disclosure above, and a common electrode on the array substrate is electrically connected with a first electrode on the color filter substrate. Because the first electrode and the common electrode are electrically connected with each other, they are applied with a same signal. For example, the common electrode on the array substrate is electrically connected with the first electrode on the color filter substrate via an anisotropy conductive adhesive, so as to achieve synchronized reception of touch sensing signal. In a display time period, a common electrode is electrically connected with a first electrode, thus a common electrode, a first electrode and a second electrode are applied with a common electrode signal at a same time.

At least one embodiment of the present disclosure provides a display device, including any touch screen provided in the embodiment of present disclosure. The display device can be display device such as a liquid crystal display, an electronic paper, an OLED (Organic Light-Emitting Diode) display and any product or component having a display function that include these devices such as a TV set, a digital camera, a cell-phone, a tablet computer or the like.

What are described above is related to the illustrative embodiments of the disclosure only and not limitative to the scope of the disclosure. The scopes of the disclosure are defined by the accompanying claims.

This application claims the benefit of Chinese patent application No. 201410141667.3 filed in China on Apr. 9, 2014, which is incorporated by reference herein as a part of this application.

The invention claimed is:

1. A touch screen, comprising a color filter substrate and an array substrate that are disposed opposite to each other, wherein the color filter substrate comprises a first base substrate and a first electrode disposed on the first base substrate;

the array substrate comprises a second base substrate and a transparent conductive layer that is disposed on the second base substrate, and the transparent conductive layer comprises a second electrode and a common electrode, with the first electrode being staggered with the second electrode;

the first electrode is a touch sensing electrode and the second electrode is a touch driving electrode, or the second electrode is a touch sensing electrode and the first electrode is a touch driving electrode;

in a touch time period, the first electrode and the common electrode are configured for receiving a touch sensing signal and the second electrode is configured for being applied with a touch driving signal, or the first electrode and the common electrode are configured for receiving the touch driving signal and the second electrode is configured for being applied with the touch sensing signal;

in a display time period, the second electrode and the common electrode are configured for loading a common electrode signal;

wherein the common electrode is of a same structure as that of the first electrode, and the common electrode forms a finger interleaving electrode structure with the second electrode;

wherein, the first electrode and the common electrode are disposed being overlapped to each other, in the direction of being perpendicular to the touch screen, orthographic projection of the first electrode is fall into the orthographic projection of the common electrode.

2. The touch screen according to claim 1, wherein the common electrode on the array substrate is electrically connected with the first electrode on the color filter substrate.

3. The touch screen according to claim 2, wherein the common electrode on the array substrate is electrically connected with the first electrode on the color filter substrate via anisotropy conductive adhesive.

4. The touch screen according to claim 1, wherein the common electrode is provided at a position corresponding to the first electrode.

5. The touch screen according to claim 4, wherein a width of the common electrode in a direction that the first electrode is arranged is greater than a width of the first electrode.

6. The touch screen according to claim 1, wherein the first electrode forms the finger interleaving electrode structure with the second electrode.

7. The touch screen according to claim 1, wherein the first electrode is a sensing electrode and the second electrode is a driving electrode.

8. The touch screen according to claim 1, wherein the color filter substrate comprises a color film layer and a black matrix film layer, with the first electrode being corresponding to the black matrix.

9. The touch screen according to claim 1, wherein the array substrate further comprises a pixel electrode layer that comprises a pixel electrode, with a position of the second electrode being corresponding to a position of the pixel electrode.

10. A display device, comprising the touch screen according to claim 1.

11. A driving method of a touch screen, comprising:

in a touch time period, a first electrode and a common electrode receive a touch sensing signal and a touch driving signal is applied by a second electrode, or the touch driving signal is applied by the first electrode and the common electrode, and the second electrode receives the touch sensing signal;

in a display time period, a common electrode signal is applied by the second electrode and the common electrode;

wherein the common electrode is of a same structure as that of the first electrode, and the common electrode forms a finger interleaving electrode structure with the second electrode;

wherein, the first electrode and the common electrode are disposed being overlapped to each other, in the direction of being perpendicular to the touch screen, orthographic projection of the first electrode is fall into the orthographic projection of the common electrode.

12. The touch screen according to claim 2, wherein the common electrode is provided at a position corresponding to the first electrode.

13. The touch screen according to claim 12, wherein a width of the common electrode in a direction that the first electrode is arranged is greater than a width of the first electrode.

14. The touch screen according to claim 2, wherein the first electrode is a sensing electrode and the second electrode is a driving electrode.

15. The touch screen according to claim 2, wherein the color filter substrate comprises a color film layer and a black matrix film layer, with the first electrode being corresponding to the black matrix.

16. The touch screen according to claim 2, wherein the array substrate further comprises a pixel electrode layer that comprises a pixel electrode, with a position of the second electrode being corresponding to a position of the pixel electrode.

17. The touch screen according to claim 6, wherein the first electrode is a sensing electrode and the second electrode is a driving electrode.

18. The touch screen according to claim 6, wherein the color filter substrate comprises a color film layer and a black matrix film layer, with the first electrode being corresponding to the black matrix.

19. The touch screen according to claim 6, wherein the array substrate further comprises a pixel electrode layer that comprises a pixel electrode, with a position of the second electrode being corresponding to a position of the pixel electrode.

* * * * *